Figure 1:
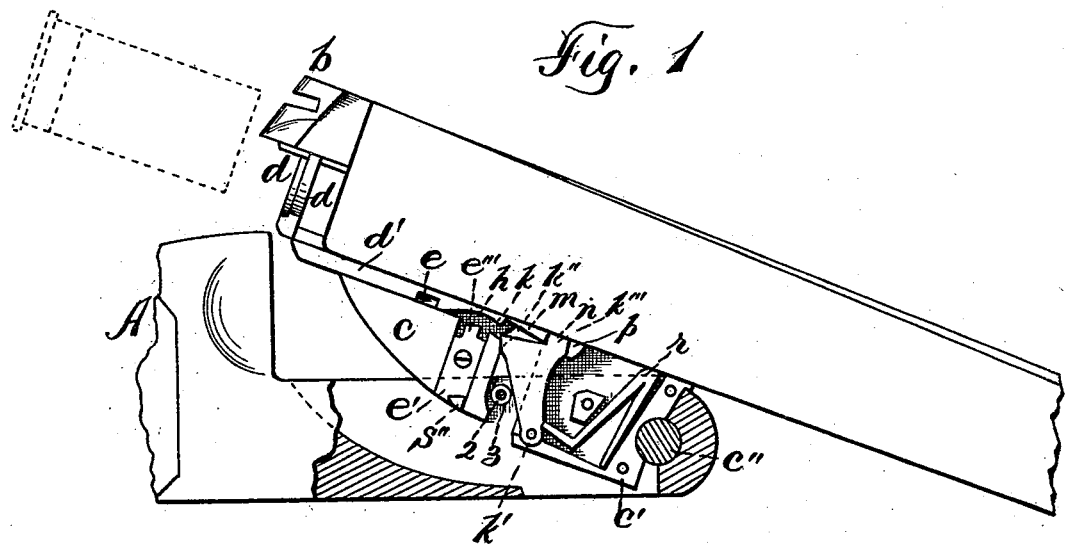

(No Model.) 4 Sheets—Sheet 1.

J. A. ROSENBERG & J. HURST.
EJECTOR AND MAINSPRING MECHANISM.

No. 519,552. Patented May 8, 1894.

WITNESSES:
H. A. Carhart,
C. B. Kimm
D. May Goodrich

INVENTORS
Joseph A. Rosenberg.
Jakob Hurst.
By Smith & Denison
ATTORNEYS.

THE NATIONAL LITHOGRAPHING COMPANY,
WASHINGTON, D. C.

(No Model.) 4 Sheets—Sheet 2.

J. A. ROSENBERG & J. HURST.
EJECTOR AND MAINSPRING MECHANISM.

No. 519,552. Patented May 8, 1894.

WITNESSES:
H. A. Carhart
C. B. Kinn
D. May Goodrich

INVENTORS
Joseph A. Rosenberg.
Jakob Hurst.
By Smith & Demson
ATTORNEYS.

THE NATIONAL LITHOGRAPHING COMPANY,
WASHINGTON, D. C.

(No Model.) 4 Sheets—Sheet 3.
J. A. ROSENBERG & J. HURST.
EJECTOR AND MAINSPRING MECHANISM.
No. 519,552. Patented May 8, 1894.
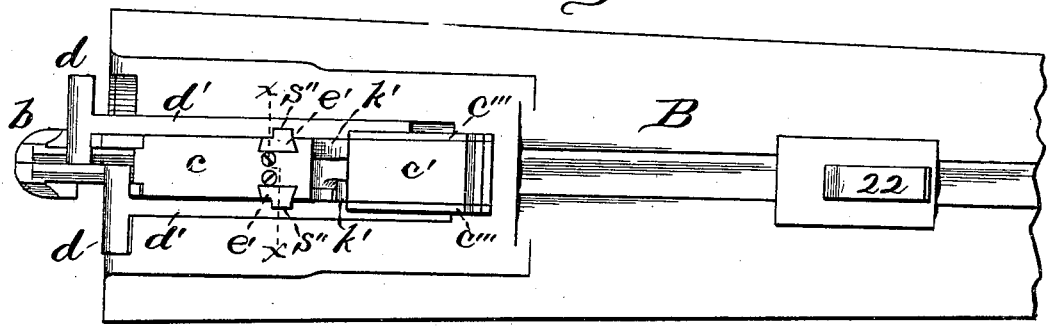
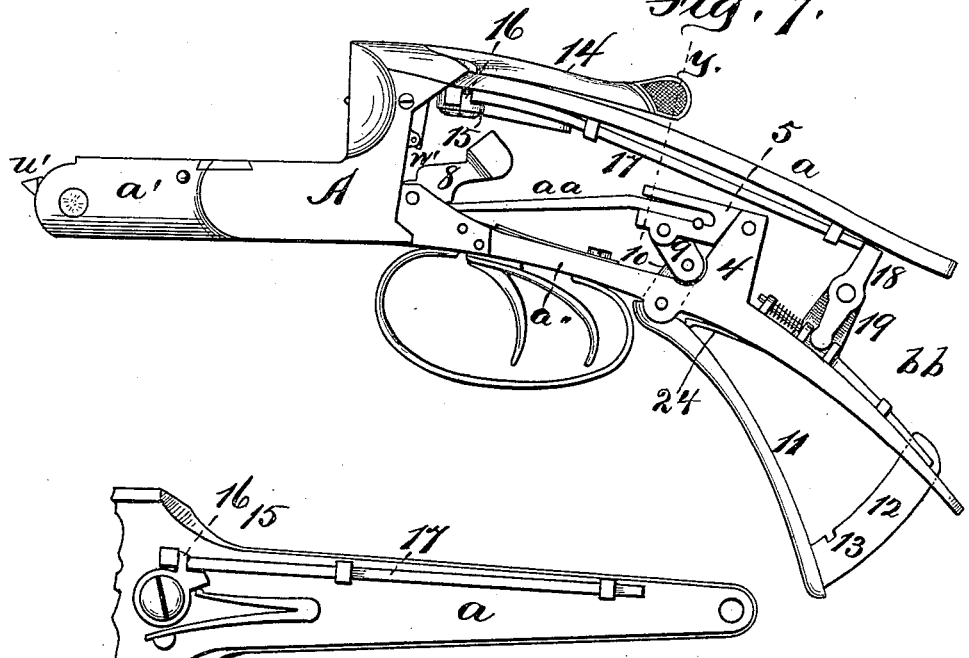
WITNESSES:
H. A. Carhart,
C. B. Kinne,
D. May Goodrich.
INVENTORS
Joseph A. Rosenberg,
Jakob Hurst,
By Smith & Dennison
ATTORNEYS.

(No Model.) 4 Sheets—Sheet 4.

J. A. ROSENBERG & J. HURST.
EJECTOR AND MAINSPRING MECHANISM.

No. 519,552. Patented May 8, 1894.

WITNESSES:
H. A. Carhart,
C. B. Kinne
D. May Goodrich

INVENTORS
Joseph A. Rosenberg,
Jakob Hurst.
By Smith & Dowson
ATTORNEYS.

THE NATIONAL LITHOGRAPHING COMPANY,
WASHINGTON, D. C.

UNITED STATES PATENT OFFICE.

JOSEPH A. ROSENBERG AND JAKOB HURST, OF SYRACUSE, NEW YORK.

EJECTOR AND MAINSPRING MECHANISM.

SPECIFICATION forming part of Letters Patent No. 519,552, dated May 8, 1894.

Application filed May 31, 1893. Serial No. 476,054. (No model.)

*To all whom it may concern:*

Be it known that we, JOSEPH A. ROSENBERG and JAKOB HURST, of Syracuse, in the county of Onondaga, in the State of New York, have invented new and useful Improvements in Breech-Loading Firearms, of which the following, taken in connection with the accompanying drawings, is a full, clear, and exact description.

Our invention relates to breech-loading firearms and particularly to that class which are provided with a shell ejecting mechanism, operative when the gun is broken down, and also provided with concealed hammers cocked by a lever under the stock engaging with the main-spring.

Our object is to provide a gun with a hammer cocking mechanism, in which sliding or longitudinally reciprocating rods are mounted in the frame extending rearward through the breech-block, and having their front ends projecting beyond the front end of the frame, and there provided with cam faces which engage with like cams in the rear of the fore-end, so that said rods are forced rearwardly when the gun is broken down and release the extractor; in which tension can also be imparted to the main springs by means of a lever pivoted below the wrist or grip of the stock, having an arm in engagement with a rocking or vertically oscillating main-spring bearing, in which the rear ends of the main-springs are secured, their front ends being in frictional engagement with the hammers, so that by pressing said lever upward the main-springs are brought up to firing tension, and will so remain so long as the lever is up, and so arranged that when said lever is down, all tension is off from said springs, and the hammers cannot be operated to fire the gun until the tension is again restored to the springs by pressing said lever up against the under side of the stock, means being provided to hold said lever up, and to release it whenever the top lever is operated to unlock the barrels; in which tension is imparted to the ejector springs by the contact of the extractor sections with the face of the breech-block in the act of closing the gun, which forces the extractor stems forward, until, when they are flush with the breech of the barrels, the extractor sears engage with them to hold them set, said stems being in engagement with hammers against which the extractor or ejector springs have their bearings, means being also provided to vertically reciprocate said sears to release the extractor stems to be ejected by the ejector springs, means being also provided by which the sears can be set out of all engagement with the extractor stems, so that the mechanism will not operate as a spring actuated automatic ejector; and in which the fore-end is detachably secured in position by means of a spring actuated rocking locking bolt, engaging with a recess in the lug under the barrels.

Our invention consists in the several novel features of construction and operation hereinafter described and which are specifically set forth in the claims hereunto annexed. It is constructed as follows, reference being had to the accompanying drawings, in which—

Figure 2:
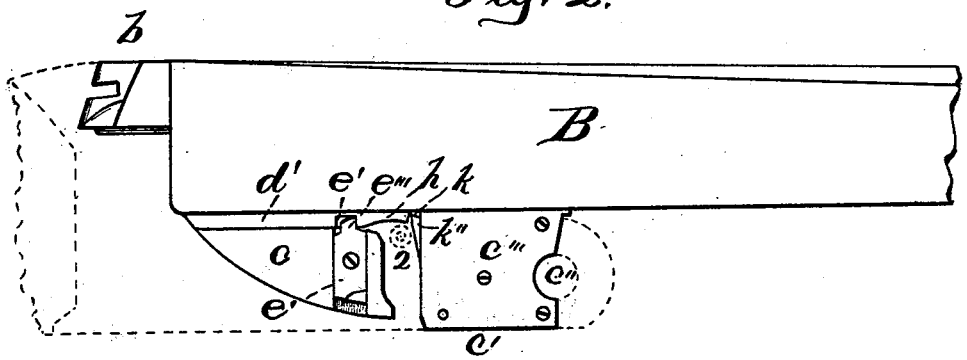
Figure 16:
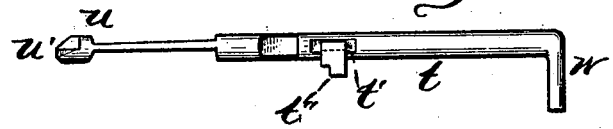
Figure 3:
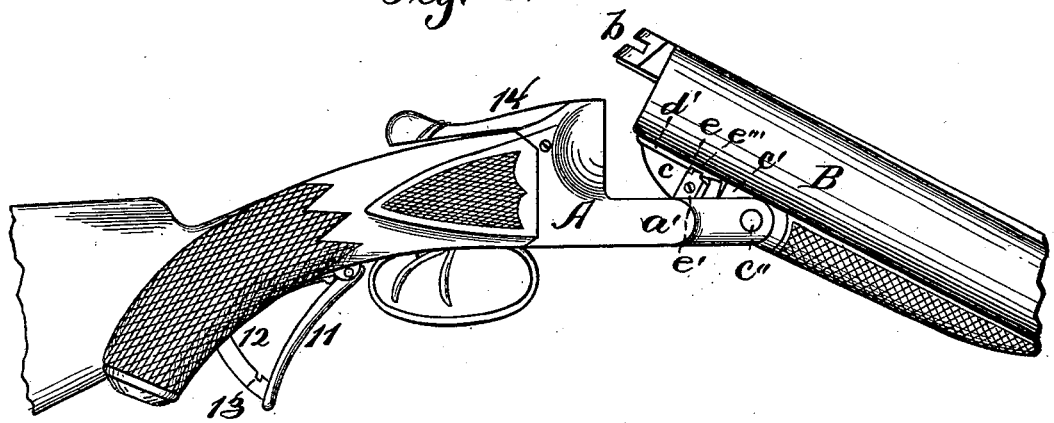
Figure 4:
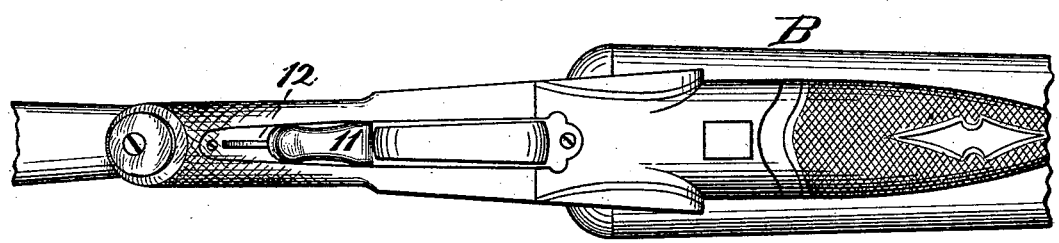
Figure 5:
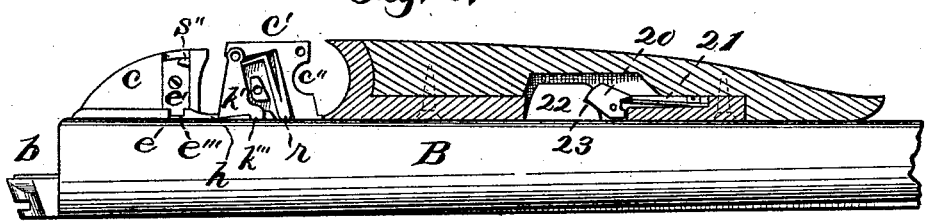
Figure 10:
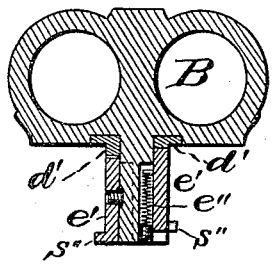
Figure 9:
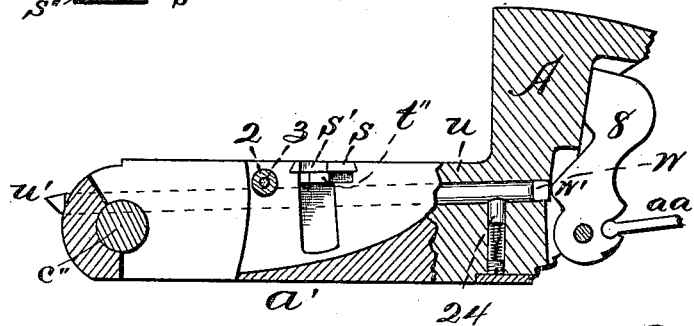
Figure 11:
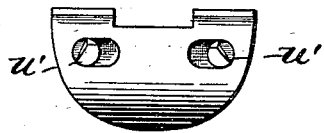
Figure 12:
Figure 13:
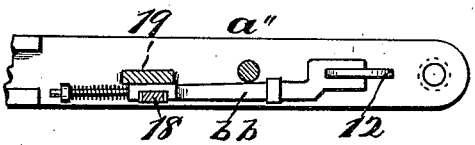
Figure 15:
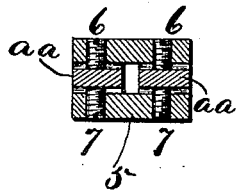
Figure 14:
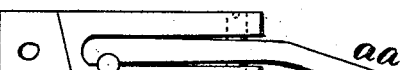

Figure 1, is a side elevation with the frame partly in vertical section. Fig. 2, is a side elevation of the barrels closed, the ejector mechanism set, ready to be operated when the barrels are broken down, and showing part of the breech-block and frame by the dotted lines. Fig. 3, is a side elevation of part of the barrels and part of the stock, the barrels being partly broken down, but not sufficiently to release the sear of the ejecting mechanism, to operate the ejector. Fig. 4, is a bottom plan of the same, closed. Fig. 5, is a vertical longitudinal section of the frame. Fig. 6, is a bottom plan of the barrels, showing one of the extractors operated to eject a shell. Fig. 7, is a side elevation of the breech-block, frame, tangs, hammer, main-spring and lever for producing tension upon the main-spring, the top-lever, and the mechanism operated by said lever to unlock the main-spring lever to remove the tension upon said spring, in the act of unlocking the barrels from the breech-block. Fig. 8, is bottom plan of the tang, showing the means for operating the push-rod to unlock the main-spring lever. Fig. 9, is a sectional elevation of part of the breech-block and frame, one hammer uncocked, a hammer cocking rod partly in dotted lines, and part of a main-spring. Fig. 10, is a vertical transverse section on line $xx$, in Fig. 6. Fig. 11, is an elevation of the front end of the frame, showing the extractor triggers and their cam faces. Fig. 12, is an elevation of the rear of the fore-end, showing the cam recesses therein. Fig. 13, is a top plan of part of the trigger-plate, showing the bolt for locking the main-spring lever. Fig. 14, is a side elevation of one of the main-springs, and of the rocking bearings in which the springs are mounted. Fig. 15, is a vertical transverse section of the main-springs, their bearing and means for regulating or adjusting their tension, on line $y$, in Fig. 7. Fig. 16, is a top plan of one of the extractor trigger rods, removed, and showing the trigger-plate carried by said rod and engaging with the extractor sear, when the gun is broken down, to draw it out of engagement with the extractor stem, to release the same to eject the shell.

A, is the breech-block, provided with a tang —$a$— and having a frame —$a'$— to which the trigger-plate —$a''$— is secured, said tang and plate being secured to the stock in any ordinary way.

B, represents the barrels provided with a rearward extension rib —$b$— adapted to fit into and be locked in a mortise in the breech-block, in any manner, or by any mechanism desired. The frame is mortised longitudinally to receive the lugs —$c$— and —$c'$— secured beneath the barrels, the latter being concaved transversely to fit partly around the hinge pin —$c''$— across the front of the frame.

The shell ejecting mechanism is constructed and operated as follows: The extractor is in sections each consisting of a head —$d$—, adapted to fit the head of a shell, and a stem —$d'$—, the rear of the barrels being recessed to receive said heads and seats are cut under each barrel to receive said stems, each seat being partly in or above the lugs —$c$—$c'$—, as shown in Figs. 6 and 10, each of said stems being of angle-iron form, creating a horizontal body, and a vertical rib or flange, the latter fitting in the groove cut in said lugs. In said flange, a notch —$e$— is cut, then toward the front said flange is cut away on an inclined and more or less curved line, as at —$h$— to the shoulder —$k$— (see Fig. 1) then from the base of said shoulder an incline —$m$— is cut, extending to the notch —$n$—; and —$p$— is a head in front of said notch —$n$—. In the lug —$c$—, a vertical groove is cut, in which the extractor sear —$e'$— is mounted and adapted to be reciprocated by a spring —$e''$— (Fig. 10) behind said sear and engaging therewith to throw it upward. Said sear has a point —$e'''$— which is adapted to engage with the notch —$e$—, as shown in Fig. 2, said sear operating to lock the extractor stem when the gun is closed, or only partly open. The lug —$c'$— is recessed in its sides and provided with a removable cover —$c'''$—, and in each recess an extractor hammer —$k'$— is pivoted, said hammer having a point —$k''$— adapted to engage with the shoulder —$k$—, and a lug —$k'''$— in engagement with the notch —$n$—;

and —$r$— is the ejector spring inserted into the recess in the side of said lug and bearing against said hammer, and when the extractor sear is drawn out of engagement with the notch —$e$—, the hammer will throw the extractor out and eject the shell. The act of closing the gun through the frictional engagement of the extractor head with the face of the breech-block forces the extractor rod forward until the sear is again in engagement with the notch —$e$—, the hammer point —$k''$— is in engagement with the shoulder —$k$— and tension is produced upon the ejector spring.

In the top of the frame, plates —$s$— are secured, each having in its inner end a notch —$s'$— coinciding with a vertical groove opening inwardly into the mortise in the frame, said groove receiving the lug —$s''$— upon the extractor sear. Under each of said plates a recess is formed connected to and communicating with the seat drilled in the frame to receive the extractor trigger rod —$t$—, which rod has a vertical slotway —$t'$— receiving the shank of the angularly bent plate —$t''$— which acts as an extractor trip, the body of which lies in and is adapted to reciprocate in the recess under said plate, and thereby to open and close the notch —$s'$— closing it when the gun is fired, and the hammer engaging with said rod forces it forward, carrying with it said trip and closing said notch, so that the lug on the sear engages with it, when the gun is broken down, and the sear is drawn out of engagement with the extractor stem and the latter is released to eject the shell; and then when the ejector trigger rod is carried back by the closing of the gun, as hereinafter described, the trip is removed from the notch and the barrels can then be removed from the frame (see Fig. 9).

An anti-friction roller —2— upon an arbor —3— across the frame mortise engages with the extractor hammer —$k'$— and when the gun is closed, the cam-face of the hammer engaging with it, aids in forcing the hammer back and producing the tension upon the ejector spring.

The extractor triggers are constructed and operated as follows: The trigger-rods —$t$— are each provided with a head —$u$— having upon its front end the cam-faces —$u'$— said head being mounted upon the end of the spring neck —$u''$— of said rod, and said cam-face being normally in contact with the inner face of the cam mortise —$v$— in the rear of the fore-end, so that when the gun is broken down said head is crowded and sprung over so that its point is in engagement with the bottom of the horizontal mortise —$v'$— and the trigger rod and trip are pushed back after the shell has been ejected and they remain in this position until, when the gun is closed, the head —$u$— springs back into the cam recess, and then when the hammer is fired the trigger rod is forced forward by the concussion of the shoulder —$w'$— upon the arm —w— and the trip is again in position to engage the extractor sear as before.

The mechanism for applying or producing tension upon the main-spring and for removing all tension therefrom, is constructed and operated as follows: A post —4— is erected upon the trigger-plate, in which the bearing —5— is pivoted, said bearing being slotted to receive the rear ends of the main-springs (Fig. 7) and by means of the screws —6— and —7— bearing upon the opposite sides of said springs they are adjusted and regulated as to the degree of tension that can be produced thereon, to vary the strength of the stroke of the firing-hammer by adjusting said screws (Fig. 15). The front end of the main-spring is in frictional engagement with the hammer —8— fitting into a notch therein. A connecting rod —9— (Fig. 7) is hinged to said bearing-block —5— and also to an arm —10— projecting through the trigger-plate and integral with the combined cocking and tension lever —11—, which is hinged to the outer face of said plate and extends rearward and is provided with another arm —12— passing through a slot near the rear end of said plate, and provided with a notch —13— with which the sliding and spring-actuated locking-bolt engages, to hold said lever up close to the trigger-plate. When this lever is forced upward, a tension is thereby produced upon the main-spring which continues until the gun is fired, or the lever lowered by releasing it from the locking-bolt. It is released by the following mechanism: The top-lever —14— by the operation of which the barrels are released to break down and open the gun, is pivoted upon the tang, in the usual manner, and as shown in Fig. 8 carries beneath the tang an arm —15— provided with a stud —16— or is otherwise adapted to engage with the sliding bar —17—, carried under the tang, its rear end engaging with a lever —18— pivoted upon the post —19— upon the trigger-plate, the lower end of said lever engaging with said locking-bolt, so that whenever the top lever is operated to release the barrels to open the gun, or to leave it closed, the bolt is withdrawn from the arm of the compression lever, and the release of this lever and its swinging outward as shown in Fig. 7 removes all tension from the main-springs, and this is a great advantage because it insures safety against accidental discharge, either in opening or closing the barrels or at any other time, although the hammers, or either of them, may remain in the full-cocked position, held by the sear or sears, yet the pulling of the trigger will not operate either hammer. Then, the gun being so carried, the firing tension is removed in the main-springs by operating the compression lever and locking it in an instant of time, and a touch upon the top lever removes it. Also when said compression lever is in the position shown in Fig. 7, after firing and operating the top-lever, then the closing of the barrels will cock either hammer or both of them, but will not produce any tension upon either main-spring.

The cocking is performed by the following mechanism: A spring —24— is secured to the trigger plate, its free end engaging with the lever —11— (Fig. 7) so that, when the release of the lever —11— removes all of the positive or firing tension upon the main-springs, this spring —24— will operate through the lever —11—, arm —10— and connection —9— to swing the bearing —5— downward and produce a reflex tension upon the main-springs, which will, by their downward pressure upon the hammers, cock them, as shown, the firing-trigger sears then being in engagement with them. The fore-end fastening comprises a pivoted bevel-face and rocking tumbler —20— mounted in the fore-end, a spring —21— engaging with it, a lug —22— upon the barrels notched as at —23— in the forward end, the lower face of said notch being rounded more or less, to permit the tumbler to rock, when the fore-end is raised at its front end to remove it, by disengaging the tumbler from said lug.

When it is desired to operate the extractor as an ordinary one, without or independent of the automatic ejecting action, the screws through the extractor sears are loosened, the sears pushed down so that their points cannot engage with the extractor stems, and the screws are tightened to hold said sears in that position, which is as though said sears were fastened in the position shown in Fig. 1; and because of this, they will not engage with the trip to give the sudden release, so that the ejector spring and hammer can act sharply, while in this instance the spring will only move the extractor gradually as the gun opens.

To hold the extractor trigger from accidental sliding or shifting, a spring-actuated friction bar —23— inserted into the frame is maintained in more or less frictional engagement with said rod.

What we claim as our invention, and desire to secure by Letters Patent, is—

1. An automatic ejector consisting of an extractor head and stem connected thereto, an extractor hammer engaging with said stem, an ejector spring engaging with said hammer and compressed by the return of the extractor and stem to their normal positions, a sear engaging with said stem, and means to disengage it therefrom, in combination.

2. The combination with the barrels and frame of a fire-arm, of an ejector comprising an extractor head and stem seated in the barrels, an extractor hammer pivoted upon a lug below the barrels and engaging said stem, an ejector spring engaging with said hammer, and a sear engaging said stem and means to operate said sear to release the ejecting mechanism.

3. The combination with the firing hammer, of an extractor rod fitting in the frame and having a flexible neck, and a head thereon provided with a cam-face, and a fore-end provided with a cam recess receiving said head and a horizontal recess receiving said head when it is sprung laterally out of said cam recess.

4. The combination with the firing hammer and the trigger-plate, of a main-spring mounted in a vertically rocking bearing and directly engaging with and having its bearing in a recess in the hammer, and a lever adapted to rock said bearing, pivotally mounted in said plate and engaging with said bearing and means to adjust the tension of the main-spring.

5. The combination with the firing-hammer and the trigger-plate, of a main-spring adjustably mounted in a vertically rocking bearing and engaging with a recess in the hammer, and a lever adapted to rock said bearing, pivoted upon said plate and engaging with said bearing.

6. The combination, with the firing-hammer, the main-spring mounted in a vertically rocking bearing and engaging directly with the hammer, of a lever operatively engaging with said bearing, and pivotally mounted, and a bolt adapted to engage with said lever to lock it.

7. The combination, with the firing-hammer, the main-spring mounted in a rocking bearing, a pivotally mounted tension-lever operatively engaging with said bearing, a bolt adapted to engage with said lever to lock it, and a top-lever operatively connected to said bolt to disengage it from said tension-lever.

8. The combination, with the firing hammer, of a main spring engaging therewith and mounted in a slot-way, having diverging faces, in a rocking bearing, and set screws adjustably engaging with the main spring on opposite sides.

In testimony whereof we have hereunto set our hands this 20th day of May, 1893.

JOSEPH A. ROSENBERG.
JAKOB HURST.

In presence of—
C. W. SMITH,
HOWARD P. DENISON.